United States Patent [19]

Georlette et al.

[11] 4,380,522
[45] Apr. 19, 1983

[54] PROCESS FOR THE MANUFACTURE OF ARTICLES FROM COMPOSITION COMPRISING MODIFIED POLYOLEFINES AND CELLULOSIC FIBRES

[75] Inventors: Pierre Georlette, Hamme-Mille; Rene Bouteille, Braine-l'Alleud, both of Belgium

[73] Assignee: Solvay & Cie., Brussels, Belgium

[21] Appl. No.: 253,556

[22] Filed: Apr. 13, 1981

Related U.S. Application Data

[63] Continuation of Ser. No. 65,881, Aug. 13, 1979, abandoned.

[30] Foreign Application Priority Data

Aug. 11, 1978 [FR] France ............................... 78 23947

[51] Int. Cl.³ .............................................. B29D 7/14
[52] U.S. Cl. ................................ 264/175; 264/176 R; 264/331.15; 264/331.17; 264/331.21
[58] Field of Search ........... 264/171, 175, 176, 331.15, 264/331.17, 331.18, 331.21, 349; 525/263, 334

[56] References Cited

U.S. PATENT DOCUMENTS

| | | | |
|---|---|---|---|
| 3,645,939 | 2/1972 | Gaylord | 260/17.4 GC |
| 3,862,265 | 1/1975 | Steinkamp | 260/878 R |
| 3,915,910 | 10/1975 | Nakano et al. | 260/17.4 CL |
| 3,962,157 | 6/1976 | Nakano et al. | 260/17.4 R |
| 4,144,304 | 3/1979 | Dereppe et al. | 264/175 |

FOREIGN PATENT DOCUMENTS

| | | |
|---|---|---|
| 860469 | 11/1977 | Belgium . |
| 862136 | of 0000 | Belgium . |
| 2252206 | of 0000 | France . |
| 2253784 | of 0000 | France . |
| 2322001 | of 0000 | France . |
| 1479335 | of 0000 | United Kingdom . |

OTHER PUBLICATIONS

H. V. Boenig, Polyolefins: Structure and Properties, Elserier Publishing Co., 1966 pp. 217–219.
Study by Institute Nationale de la Propriete Industrielle #120496.

*Primary Examiner*—Jeffery R. Thurlow
*Assistant Examiner*—W. Thompson
*Attorney, Agent, or Firm*—Spencer & Kaye

[57] ABSTRACT

A process for the manufacture of shaped articles from compositions containing 30 to 70% by weight of polyolefine which is a high density polyethylene modified with polar monomers and 30 to 70% by weight of cellulosic fibres. These compositions are malaxated at a temperature at least 20° C. above the melting point of the polyolefine. The process is applicable to the manufacture of panels which can be used in the automobile industry.

7 Claims, No Drawings

PROCESS FOR THE MANUFACTURE OF ARTICLES FROM COMPOSITION COMPRISING MODIFIED POLYOLEFINES AND CELLULOSIC FIBRES

CROSS REFERENCE TO RELATED APPLICATION

This application is continuation of Applicant's copending United States Application Ser. No. 065,881 filed Aug. 13, 1979 now abandoned.

BACKGROUND OF THE INVENTION

The present invention relates to a process for the manufacture of shaped articles, of any desired shape, from polyolefine compositions comprising polyolefines modified by means of polar monomers, and high contents of cellulosic fibres.

Belgian Pat. No. 860,469 filed on Nov. 4, 1977 in the name of the Solvay & Cie. has already disclosed a process for the manufacture, from the above-mentioned polyolefine compositions, of particular shaped articles, namely composite panels comprising metal foils which are combined by hot-pressing with polyolefine sheets consisting of the above-mentioned polyolefine compositions.

According to this known process, the polyolefine compositions can be prepared and converted to sheets when they are at temperatures just above the melting points of the polyolefines employed. Thereafter, the polyolefine sheets are brought into contact with the metal foils and subjected to a pressing operation which is carried out at temperatures markedly higher than the melting points of the polyolefines employed. It is during this pressing operation that the extremely high adhesion between the polyolefine sheets and the metal foils, which characterises the panels in question, develops. This very high adhesion results from the conjoint use of polyolefines modified with polar monomers, and of cellulosic fibres. It goes without saying that this known process is limited in its applications to the manufacture of articles having certain particular shapes and having a particular constitution.

It is furthermore known, from British Pat. No. 1,479,335 filed on Nov. 20, 1974 in the name of MITSUBISHI PETROCHEMICAL Co LIMITED, to shape polyolefine compositions comprising polyolefines modified by means of polar monomers and low contents of cellulosic fibres by malaxating at temperatures markedly greater than the melting points of the polyolefines employed. The shaped articles obtained from such polyolefine compositions have inadequate mechanical properties for numerous applications.

Finally, the shaped articles obtained from polyolefine compositions comprising high contents of polyolefines modified with polar monomers and of cellulosic fibres, shaped by malaxating at temperatures just above the melting points of the polyolefines employed, also exhibit inadequate properties for numerous applications.

SUMMARY OF THE INVENTION

The present invention hence overcomes the problem which consists in providing a process for the manufacture of shaped articles of any desired shapes, which consist exclusively of polyolefine compositions comprising high contents of polyolefines modified with polar monomers and of cellulosic fibres, and exhibiting exceptionally good mechanical properties.

To this effect, the present invention relates to a process for the manufacture of shaped articles from polyolefine compositions comprising at least 10% by weight of polyolefine modified by means of polar monomers and at least 10% by weight of cellulosic fibres, according to which process the polyolefine compositions are subjected to a malaxating operation carried out at a temperature which is at least 20° C. above the melting point of the polyolefine, before the compositions are moulded.

The fact that it is possible to carry out the malaxating operation at such high temperatures is surprising because it would have been expected, for the reasons mentioned above, that these compositions would adhere strongly to the metal surfaces of the malaxating equipment, making any malaxating operation impossible at these temperatures.

DETAILED DESCRIPTION OF THE INVENTION

The polyolefine compositions employed according to the invention preferably comprise between 20 and 80% by weight of modified polyolefines and between 20 and 80% by weight of cellulosic fibres. The compositions which give shaped articles exhibiting the most advantageous mechanical properties comprise between 30 and 70% by weight of modified polyolefines and between 30 and 70% by weight of cellulosic fibres. In addition to modified polyolefines and cellulosic fibres, these compositions can contain other materials compatible with the above components, such as unmodified polyolefines or non-cellulosic fibres. It is preferred that the compositions should contain at least 80% by weight of modified polyolefines and of cellulosic fibres, the best results being obtained when they contain at least 90% by weight of these.

The term polyolefines modified by means of polar monomers is intended to denote any polyolefines which in addition to monomeric units derived from unsubstituted olefines contain units derived from polar monomers.

The modified polyolefines employed according to the invention can be any polymers which in general contain at least 50% and preferably at least 80% of monomeric units derived from unsubstituted olefines possessing from 2 to 6 carbon atoms in their molecule, as well as units derived from polar monomers. Examples which may be mentioned are high density polyethylene, polypropylene, poly-1-butene, poly-4-methyl-1-pentene, ethylene/propylene copolymers, ethylene/vinyl acetate copolymers and ethylene/vinyl chloride copolymers modified with units derived from polar monomers. The best results are obtained with polyolefines which except for the units derived from polar monomers consist exclusively of units derived from unsubstituted olefines.

Advantageously, modified polyolefines containing, in their molecule, at least 80% of units derived from ethylene or from propylene are used. Advantageous results are obtained with modified high density polyethylenes and more particularly with those whose melt indices, measured according to standard specification ASTM-D-1238-65 T, are between 0.05 and 20 and preferably between 0.5 and 10 g/10 min.

The polar monomers employed for modifying the polyolefines can be any organic compounds containing at least one unsaturated bond, preferably of the olefinic type, and at least one carboxyl group, which is optional in the form of an anhydride.

Preferably, monomers containing from 3 to 12 carbon atoms in their molecule are used. These polar monomers can in particular be unsaturated monocarboxylic acids such as acrylic, methacrylic or chloroacrylic acid, or unsaturated polycarboxylic acids such as maleic, fumaric and itaconic acid, or the anhydrides derived from these acids, such as maleic anhydride. The preferred polar monomers are acrylic acid and methacrylic acid and maleic anhydride. The best results are obtained with maleic anhydride.

The amount of polar monomers with which the polyolefines are modified is in general between 0.002 and 20% by weight of the polyolefine employed. Usually, it is preferred that this amount should be between 0.01 and 10%, the best results being obtained between 0.05 and 5%.

According to a particular embodiment of the invention, the polyolefine compositions are prepared by mixing the cellulosic fibres and the polyolefines, the latter having been modified beforehand and being in a sufficiently finely divided solid form to permit mixing.

The polyolefines, modified beforehand, which are employed according to this embodiment can advantageously be random copolymers, graft copolymers or block copolymers. However, graft copolymers in which the main chain (or skeleton) has a polyolefine structure and the side chains (or grafts) are derived from polar monomers are preferred.

The graft copolymers can be manufactured by any of the known grafting techniques such as grafting in solution, by irradiation or in the presence of initiators, and grafting by malaxating in the molten state. The grafting reaction is advantageously carried out in the presence of free radicals which can be generated by any of the techniques known for this purpose, such as irradiation or ozonisation. Usually, the process is carried out at a high temperature and preferably in the presence of compounds which liberate free radicals under the action of heat. Very particularly, it is preferred to carry out the process in the presence of organic peroxide compounds, with or without addition of polyfunctional agents, having a decomposition temperature above 130° C. Examples of peroxide compounds which can be used are 2,5-dimethyl-2,5-di-(tertiary-butylperoxy)-hexane, 2,5-dimethyl-2,5-di-(tertiary-butylperoxy)-hexyne, di-tertiary-butyl peroxide, tertiary-butyl hydroperoxide, alpha, alpha'-di-(tertiary-butylperoxy)-diisopropylbenzene and dicumyl peroxide. The above-mentioned peroxides are generally used at the rate of 0.01 g to 20 g per kg of polyolefine employed. Usually, amounts of between 0.05 and 10 g/kg, preferably of between 0.1 and 5 g/kg, are employed.

The modified polyolefines employed according to this embodiment can contain various additives usually introduced into the polyolefines, such as fillers, in particular mineral fillers, stabilisers, lubricants, anti-acid agents, agents for increasing the impact strength, colourants and the like. These additives are preferably present at the rate of less than 10% by weight of the modified polyolefine.

The polyolefines which have been modified beforehand can be employed in any desired form and preferably in the desired solid form which allows dry mixing with cellulosic fibres, for example in the form of powders, flakes, particles, granules, fibrids, fibres or fibre scrap.

The cellulosic fibres employed according to the invention can be of any type and can be in any sufficiently finely divided form. Thus it is possible to employ particles or fibres of deciduous or resinous timber, sawdust, straw waste, paper pulp and shredded scrap paper for preparing the mixtures.

It is preferred to use cellulosic fibres which are in the form of particles having a mean size of between 0.1 and 3 mm and having a water content not exceeding 15% by weight and preferably 10% by weight. The preferred cellulosic fibres are ligno-cellulosic materials produced from resinous or deciduous timber.

According to a preferred embodiment of the invention, the polyolefine compositions are not prepared from polyolefines which have been modified beforehand but instead from unmodified polyolefines. According to this embodiment the polyolefine compositions are prepared by directly mixing the cellulosic fibres with the unmodified polyolefines and polar monomers and subjecting the compositions to a malaxating operation at a high temperature, in accordance with the invention. Preferably, the mixture also contains compounds capable of liberating free radicals under the action of heat.

All the information provided above with reference to the embodiment where polyolefines modified beforehand are employed applies, mutatis mutandis, to the preferred embodiment. This is particularly the case with regard to the information relating to the choice of the polyolefines, of the polar monomers, of the amount of polar monomers, of the compounds capable of liberating free radicals, of their amount, of the form of the polyolefines, of the cellulosic fibers, and of their form.

Regardless of the embodiment used, the polyolefine compositions can be prepared in accordance with any of the known techniques by mixing the ingredients either when the polyolefines are in the solid state or when they are in the molten state. In every case, the polyolefine compositions are subjected to a malaxating operation at a temperature at least 20° C. above the melting point of the polyolefine.

The malaxating operation can be carried out by any means known for this purpose. Thus, malaxators of the external type or of the internal type can be used equally well. However, for technical, ecological and economic reasons it is preferred to use malaxators of the internal type and more particularly extruders which constitute a particular category of internal malaxators.

The malaxating operation can be carried out under the usual conditions for shaping polyolefine articles, these conditions being well-known to those skilled in the art. Preferably, the malaxating operation is carried out at temperatures at least 30° C. above the melting point. The best results are obtained when it is carried out at temperatures at least 40° C. above the melting point.

The term melting point of the polyolefines is intended to denote the temperature at which all the crystalline parts present in the polyolefine are molten (H. V. BOENIG, Polyolefins: Structure and Properties, Elsevier Publishing Co. Amsterdam—London—New-York, 1966, page 217 et seq.).

The maximum temperature which can be applied during the malaxating operation is not critical in itself, and is in practice limited by the nature and the decomposition temperatures of the constituents of the polyolefine composition. In general, temperatures not exceeding 250° C. are used. Preferably, the process is carried out at temperatures below 220° C. if the polyolefine is high density polyethylene.

The duration of the malaxating operation at a high temperature is chosen so as to take into account the nature of the modified polyolefine and of the cellulosic fibres, and the temperature employed. This duration is generally between 5 seconds and 30 minutes and most frequently between 10 seconds and 15 minutes. It is preferred to employ durations of between 30 seconds and 10 minutes.

After having been malaxated, the polyolefine compositions are in a pasty form and are mouldable in accordance with the conventional plastic moulding techniques such as extrusion, injection-moulding, compression-moulding or calendering. They are thus advantageously moulded directly, either into their final shape, for example a profile, or into a semi-finished shape, for example a panel.

The shaped articles obtained according to the invention can be used in numerous applications. A particularly advantageous application is the manufacture of panels by extrusion using a flat die, or by calendering. These panels can subsequently be thermoformed, optionally after having been coated with a suitable decorative sheet, so as to produce articles such as internal panels of car doors.

The invention is explained by the embodiments which are described below and which are given by way of illustration.

EXAMPLE 1 (COMPARISON)

A composition comprising 60 parts by weight of beechwood scrap and 40 parts by weight of high density polyethylene sold under the trademark ELTEX, grade A 1050, by the Solvay & Cie., is treated for 5 minutes by means of a TROESTER malaxator of which the rolls are kept at 140° C.

The hide obtained is then pressed for 5 minutes at 140° C. under a pressure of 20 kg/cm$^2$.

The main characteristics of the sheet obtained are shown in Table I below.

EXAMPLE 2 (COMPARISON)

A composition comprising 60 parts by weight of beechwood scrap and 40 parts by weight of high density polyethylene (ELTEX A 1050) containing 5 percent, relative to the weight of the polymer, of maleic anhydride and 0.5 percent, relative to the weight of the polymer, of dicumyl peroxide is treated for 5 minutes by means of TROESTER malaxator of which the rolls are kept at 140° C.

The hide is then pressed as in Example 1.

The main characteristics of the sheet obtained are shown in Table I below.

EXAMPLE 3 (COMPARISON)

A composition comprising 45 parts of weight of high density polyethylene (ELTEX A 1050), 50 parts by weight of beechwood scrap and 5 parts by weight of grafted polyethylene, obtained by extruding polyethylene (ELTEX A 1050) with 2.5 percent, relative to the weight of the polymer, of maleic anhydride and 0.2 percent, relative to the weight of the polymer, of di-tert.-butyl peroxide, is treated for 20 minutes by means of a TROESTER malaxator of which the rolls are kept at between 150° and 155° C.

The hide obtained is pressed under the conditions described in Example 1. The main characteristics of the sheet obtained are shown in Table I below.

EXAMPLE 4

50 parts by weight of high density polyethylene (ELTEX B 4020), about 50 parts by weight of spruce sawdust, 0.625 part by weight of maleic anhydride and 0.0625 part by weight of 2,5-dimethyl-2,5-(di-tertiary-butylperoxy)-hexane are mixed for 10 minutes in a LO-EDIGE mixer which operates without heating. This composition is subsequently treated in an INTERMIX internal mixer sold by Société Repiquet at 180° C. for 5 minutes and is discharged into a mixer-homogeniser of which the rolls are heated to 160° C., in order to homogenise the composition for 2 minutes.

The composition obtained is then pressed as in Example 1. The main characteristics of the sheet obtained are shown in Table I below.

EXAMPLE 5

50 parts by weight of polyethylene (ELTEX A 1050), 50 parts by weight of spruce sawdust, 2.5 parts by weight of maleic anhydride and 0.25 part by weight of 2,5-dimethyl-2,5-(di-tertiary-butylperoxy)-hexane are mixed for 10 minutes by means of a DYOSNA mixer, which operates without heating.

The mixture is then fed into the hopper of an EICKHOFF PWE 130 PV extruder equipped with 8 satellites, the barrel temperature being 170° C. and the die temperature 180° C.

The sheet leaves the extruder through a flat die and is subsequently polished between the rolls of a hot polishing calender without any adhesion being observed. The main characteristics of the sheet obtained are summarised in Table I below.

EXAMPLE 6

The same conditions as in Example 5 are used, but starting from a mixture which only contains 0.625 part by weight of maleic anhydride and 0.0625 part by weight of peroxide compound.

The sheet obtained by extrusion through a flat die exhibits the characteristic properties shown in Table I below.

EXAMPLE 7

A composition comprising 50% by weight of beechwood scrap and 50% by weight of grafted polyethylene (ELTEX A 1050) obtained by prior extrusion of the said polyethylene with 2.5% by weight of maleic anhydride and 0.2% by weight of di-tert.-butyl peroxide is treated for 20 minutes by means of a TROESTER malaxator of which the rolls are kept at between 205° and 210° C.

The sheet is pressed as described in Example 1 and the main characteristics of the sheet obtained are shown in Table I below.

TABLE I

|  | Examples | | | | | | |
| --- | --- | --- | --- | --- | --- | --- | --- |
|  | 1 (comparative) | 2 (comparative) | 3 (comparative) | 4 | 5 | 6 | 7 |
| Thickness, mm | 2.5 | 2.75 | 2.5 | 2.5 | 2.5 | 2.5 | 2.5 |
| Adhesion to aluminium, kg/cm | 0 | 1.86 | 2.14 | 1.80 | 2.58 | 2.94 | 2.07 |
| Maleic anhydride content, (g/kg of polyethylene) | 0 | 0.7 | 1.4 | 1.4 | 10.3 | 1.6 | 14.0 |
| Tensile strength, kg/cm$^2$ longitudinal direction | 170 | 145 | 222 | 324 | 390 | 410 | 309 |
| transverse direction | 115 | 51 | 181 | 260 | 350 | 330 | 204 |
| Flexural modulus of elasticity (longitudinal direction), kg/cm$^2$ | 30,000 | 30,000 | 31,000 | 33,000 | 34,000 | 37,000 | 33,000 |
| Torsional modulus of rigidity at 23° C., kg/cm$^2$ (longitudinal direction) | 3,000 | 3,000 | — | 7,026 | 5,250 | 5,870 | — |

The tensile strength is measured in accordance with standard specification ASTM 412 D. The adhesion is measured by the peel test according to standard specification ASTM-D 903 (pulling angle: 180°).

From the comparison of the examples it is possible to deduce that the sheets obtained according to the invention have mechanical properties (especially tensile strengths) which are markedly superior to those of the products obtained according to the prior art, prepared from a mixture which does not contain all the ingredients of the mixtures according to the invention, or malaxated at a lower temperature, or containing less than 10% by weight of modified polyolefine.

What is claimed is:

1. Process for manufacture of a shaped article from a polyolefine composition comprising between 30 and 70% by weight of a polyolefine which is a high density polyethylene modified by means of a polar monomer and between 30 and 70% by weight of cellulosic fibres, comprising: subjecting the polyolefine composition to a malaxating operation carried out at a temperature which is at least 40° C. above the melting point of the polyolefine, before the composition is moulded.

2. Process according to claim 1 wherein the polyolefine is a modified high density polyethylene having a melt index of between 0.5 and 10 g/10 min.

3. Process according to claim 1 or 2, wherein the polyolefine is a polyolefine modified by means of maleic anhydride.

4. Process according to claim 1 or 2, wherein the polyolefine is a polyolefine modified by grafting by means of polar monomers.

5. Process according to claim 4, wherein the polyolefine composition is prepared by directly mixing the unmodified polyolefine, the polar monomer and the cellulosic fibres.

6. Process according to claim 1 or 2, wherein the polyolefine composition is moulded directly after malaxating.

7. Process according to claim 6, wherein the polyolefine composition is moulded into panels by calendering.

* * * * *